Patented Aug. 11, 1942

2,292,575

UNITED STATES PATENT OFFICE 2,292,575

DYESTUFF INTERMEDIATE PRODUCTS FROM BILE ACID AMIDES

Hans Loleit, Dessau, and Gustav Wilmanns, Wolfen, Kreis Bitterfeld, Germany, assignors, by mesne assignments, to General Aniline & Film Corporation, New York, N. Y., a corporation of Delaware No Drawing. Application July 13, 1939, Serial No. 284,257. In Germany July 16, 1938

4 Claims. (Cl. 260—397.1)

This invention relates to dyestuff intermediate products and more particularly to intermediate products for azo-, quinonimine- and azomethine dyestuffs.

For the purpose of dyeing these intermediate products are coupled with diazo-compounds or jointly oxidized with phenylenediamine, aminophenols or the like, or caused to react with nitroso-compounds which are derived from secondary or tertiary aromatic amines or phenols. In photography use is made of the property of such intermediate products of forming dyestuffs on the silver picture when the silver halide emulsion is developed with special developers. They can also be used in producing color pictures by azo-coupling.

It is an object of the invention, therefore to provide novel dyestuff components.

Another object of the invention resides in the provision of new color-forming development components which are fast to diffusion.

Still further objects will appear from the detailed description following hereinafter.

The invention consists in the process of causing a chloride of a bile acid containing a hydroxyl group which is esterified to react with a dyestuff component containing an amino-group and suitable for the production of an azo-, quinonimine-, azomethine dyestuffs or another dyestuff component which contains at least one free amino-group. The reaction is preferably conducted in the presence of an alkaline condensing agent.

As suitable dyestuff components may be named, for example anilines, naphthylamines, aminophenols, aminonaphthols, aminohydroxydiphenyls, compounds having active methylene- and methyl-groups, for instance pyrazolones, acetic acid ester derivatives, isoxazolones, cumaranones, oxindols, cyanoacetophenones and other color formers proposed for color-forming development, for example those described by Fischer, U. S. Patents, Nos. 1,055,155 and 1,102,027. These dyestuff components may contain any desired substituents, for example halogen, alkyl, aralkyl, aryl, sulfo- or carboxyl radicals; however, obviously there must be present in the molecule at least one position capable of coupling. Of the phenols and naphthols the most important are those which in the ortho- or para-position to the hydroxyl group are either unsubstituted or contain a negative group, for instance halogen or sulfo-group capable of being eliminated during the coupling. The following components may be named for example: meta-aminophenol, 1-hydroxy-3-amino-6-methylbenzone, 5-aminoresorcinol, salicylyl-para-aminoanilide, 1 - amino - 5 - naphthol, 1-hydroxy-2-naphthoyl - para - aminoanilide, 3 - hydroxy-4-aminodiphenyl, 4:4'-diamino-3:3'-dihydroxydiphenyl, acetoacetic acid - para - aminoanilide, monoacetoacetic acid benzidide, para-aminobenzoylacetic acid anilide-para'-carboxylic acid (which is obtained by condensation of para-nitrobenzoylacetic ethyl ester and para-aminobenzoic acid and subsequent reduction of the nitro-group to the amino-group), 1:3'-amino-5'-sulfophenyl - 3 - methyl - 5 - pyrazolone, 1:3'-aminophenyl - 3 - methyl - 5 - pyrazolone, 1:3'-amino - 5'- sulfophenyl - 3:4'' - aminophenyl - 5-pyrazolone. However, the invention is not limited to the examples named, for any component may be used which has a tendency to form azo-, quinonimine- or azomethine dyestuffs. As will be obvious from the foregoing examples, the amino-group necessary for union with the bile acid need not be directly situated on the radical having the coupling position but may be united with the said radical through a further aromatic, aliphatic, araliphatic radical, for instance phenyl, diphenyl, stilbene or the like.

Among bile acids containing hydroxyl are included all carboxylic acids directly derived from cyclopentanoperhydrophenanthrene and containing a hydroxyl group in addition to the carboxyl group, for instance cholic acid, desoxycholic acid, apocholic acid, lithocholic acid, $\beta$-3-hydroxy-bisnorcholic acid or the like. It is not, however, necessary to isolate the pure bile acid, since the mixture may be used which occurs in galls, for instance ox-gall or pig-gall. Under some conditions even a separation of the fatty acids from this mixture need not be undertaken. Also choleic acids may be used. It is also possible to use taurocholic acid and glycocholic acid, as well as mixtures of these with fatty acids.

The hydroxyl groups are esterified by usual methods with aliphatic acids, their anhydrides or halides, for instance with formic acid, glacial acetic acid, benzoyl chloride, paratoluenesulfochloride (Berichte 57, page 1620, (1924), Journ. Am. Chem. Soc. 57, page 1393 (1935), Zeitschrift fürphysiol. Chem. (Hoppe-Seyler), 110, page 143 (1920)).

The halides of these esterified acids are obtained with the aid of halogenating agents, for instance thionyl chloride, phosphorus trichloride, phosphorus tribromide, phosphorus pentachloride with or without the use of a solvent, for instance benzene, ether or chloroform.

The bile acid chloride is condensed with the amino-group of the dyestuff component, preferably by use of an alkaline condensing agent, for instance pyridine, piperidine or trimethylamine, at ordinary or raised temperature. Alkali carbonate or alkali hydroxide may also be used, but they necessitate a tedious working up of the product of the reaction. From the condensation products thus obtained the esterified acid groups may be eliminated by means of alkalies.

The intermediate products obtained by the invention are very valuable for various purposes in the dyeing industry. They are especially suitable for producing silver halide emulsion layers which are used in color photography. For this purpose the silver halide emulsions prepared with the dyestuffs may be made into multi-layer photographic material. The production of the color picture may be by means of color development, oxidation or azo-coupling.

The following examples illustrate the invention:

Example 1

A benzene solution of somewhat more than 1/20 mol triformylcholic acid chloride (Journ. Amer. Chem. Soc. loc. cit.) is gradually added by drops to a solution of 1/20 mol para-aminobenzoylacetanilide-para'-carboxylic acid in pyridine at room temperature, and the whole is allowed to stand for about 2 hours. The end of the reaction is indicated by the fact that the solution no longer gives an azo-reaction. The product is isolated by pouring the solution into ice.

Example 2

A benzene solution of somewhat more than 1/20 mol triformylcholic acid chloride is added by drops to a solution kept at 100° C. of 1-hydroxy-2-naphthoyl-para-aminoanilide in pyridine in such a manner that the benzene is distilled during the reaction. The product is isolated by pouring the mass into a mixture of ice and hydrochloric acid and after it has been dried it is sulfonated by heating it with concentrated sulfuric acid at 40° C. The sulfonated product is isolated by pouring the solution on ice.

Example 3

A benzene solution of somewhat more than 1/20 mol triformylcholic acid chloride is added by drops to a boiling solution of 1/20 mol 1-(3'-amino-5'-sulfophenyl)-3-methyl-5-pyrazolone in pyridine in such a manner that the benzene is distilled during the reaction. The product is isolated by pouring the mass into a mixture of ice and common salt.

Example 4

A benzene solution of somewhat more than 1/20 mol diformyldesoxycholic acid chloride (which may be produced by the action of an excess of thionyl chloride on diformyldesoxycholic acid, distilling the thionyl chloride and grinding the radical with benzene) is added by drops to a boiling solution of 1/40 mol 1:3'-aminophenyl-3(4''-aminophenyl)-5-pyrazolone in pyridine while simultaneously distilling the benzene. The product is isolated by pouring the mass into ice.

Example 5

A mixture of bile acids obtained after separating the fatty acids from ox-gall is converted into formylbile acid chlorides by heating with an excess of formic acid, distilling the formic acid in a vacuum, treating the radical with an excess of thionyl chloride, distilling in a vacuum the excess when the reaction is complete and grinding the radical in benzine. This mixture of chlorides is condensed in the manner described in Example 3 with 1-(3'-amino-5'-sulfophenyl)-3-methyl-5-pyrazolone.

Example 6

A mixture of bile acids obtained from ox-gall and still containing fat is converted into the corresponding halides as described in Example 5, and the chlorides are added little by little to a boiling solution of 1-(3'-amino-5'-sulfophenyl)-3-methyl-5-pyrazolone in pyridine in such quantity that the mass no longer shows the azo-reaction. The product is isolated by pouring the mass into a mixture of ice and hydrochloric acid.

We claim:

1. An amide of a bile acid containing esterified hydroxyl groups, the nitrogen atom of said amide being linked to an atom in the molecular system of a color forming development component having a group selected from the class consisting of active methyl- and methylene groups.

2. The amide of triformylcholic acid in which the nitrogen atom is linked to an atom in the molecular system of a color-forming development component having a group selected from the class consisting of active methyl and methylene groups.

3. The amide of desoxycholic acid in which the nitrogen atom is linked to an atom in the molecular system of a color-forming development component having a group selected from the class consisting of active methyl and methylene groups.

4. The mixture of amides of the bile acids of ox-gall esterified with formic acid, the nitrogen atoms of said amides being attached to atoms in the molecular system of color forming development components having a group selected from the class consisting of active methyl and methylene groups.

HANS LOLEIT.
GUSTAV WILMANNS.